US012010466B2

(12) United States Patent
Tsai et al.

(10) Patent No.: US 12,010,466 B2
(45) Date of Patent: Jun. 11, 2024

(54) VISUAL RECOGNITION BASED METHOD AND SYSTEM FOR PROJECTING PATTERNED LIGHT, METHOD AND SYSTEM APPLIED TO ORAL INSPECTION, AND MACHINING SYSTEM

(71) Applicant: INDUSTRIAL TECHNOLOGY RESEARCH INSTITUTE, Hsinchu (TW)

(72) Inventors: Cheng-Han Tsai, Hsinchu (TW); Kuo-Feng Hung, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 394 days.

(21) Appl. No.: 17/559,070

(22) Filed: Dec. 22, 2021

(65) Prior Publication Data

US 2022/0408067 A1  Dec. 22, 2022

Related U.S. Application Data

(60) Provisional application No. 63/213,256, filed on Jun. 22, 2021.

(30) Foreign Application Priority Data

Nov. 12, 2021  (TW) .................................. 110142197

(51) Int. Cl.
*H04N 9/31* (2006.01)
*B25J 19/02* (2006.01)
(Continued)

(52) U.S. Cl.
CPC ........... *H04N 9/3194* (2013.01); *H04N 23/56* (2023.01); *H04N 23/61* (2023.01); *B25J 19/023* (2013.01); *G06V 40/168* (2022.01)

(58) Field of Classification Search
None
See application file for complete search history.

(56) References Cited

U.S. PATENT DOCUMENTS 11,030,739 B2  6/2021  Watanabe
11,030,798 B2  6/2021  Kuo
(Continued)

FOREIGN PATENT DOCUMENTS

CN   101478641 B   2/2013
CN   104052977 A   9/2014
(Continued)

OTHER PUBLICATIONS

Taiwanese Ofice Action and Search Report for Taiwanese Application No. 110142197, dated Nov. 7, 2022.
(Continued)

*Primary Examiner* — Soo Shin
(74) *Attorney, Agent, or Firm* — Birch, Stewart, Kolasch & Birch, LLP

(57) ABSTRACT

A visual recognition based method for projecting patterned light includes: projecting a calibration image onto a projection screen by a projection module; capturing the calibration image by an image-capturing module to obtain a calibration information between the projection module and the image-capturing module; capturing an object by the image-capturing module to obtain a to-be-recognized image of the object; detecting the object in the to-be-recognized image and acquiring a plurality of feature points associated with a plurality of feature areas of the object in the to-be-recognized image; retrieving a plurality of target feature points corresponding to a target object from the feature points; obtaining a projection coordinate of the target feature points\ according to the calibration information and providing the projection coordinate to the projection module; and projecting a projection pattern with shape corresponding to the (Continued)

target object onto the object by the projection module according to the projection coordinate.

35 Claims, 15 Drawing Sheets

(51) Int. Cl.
*G06V 40/16* (2022.01)
*H04N 23/56* (2023.01)
*H04N 23/61* (2023.01)

(56) References Cited

U.S. PATENT DOCUMENTS

| | | | | |
|---|---|---|---|---|
| 2004/0061838 | A1* | 4/2004 | Mochizuki | H04N 5/74 353/69 |
| 2010/0328442 | A1 | 12/2010 | Yang et al. | |
| 2014/0160115 | A1* | 6/2014 | Keitler | G06T 7/248 345/419 |
| 2017/0054954 | A1* | 2/2017 | Keitler | H04N 17/002 |
| 2022/0189131 | A1* | 6/2022 | Nouri | G06V 40/174 |

FOREIGN PATENT DOCUMENTS

| | | |
|---|---|---|
| CN | 104349096 A | 2/2015 |
| CN | 105411678 B | 2/2018 |
| CN | 108074252 A | 5/2018 |
| CN | 108883898 A | 10/2018 |
| CN | 100020003 A | 6/2019 |
| CN | 110276808 A | 9/2019 |
| CN | 110432857 A | 11/2019 |
| CN | 107645609 B | 1/2020 |
| CN | 110929593 A | 3/2020 |
| CN | 111460970 A | 7/2020 |
| CN | 111986257 A | 11/2020 |
| TW | 201400967 A | 1/2014 |
| TW | I505233 B | 10/2015 |
| TW | 201945141 A | 12/2019 |

OTHER PUBLICATIONS

Ayi et al., "Interfacing of Matlab with Arduino for face detection and Tracking Algorithm using Serial Communication," Proceedings of the International Conference on Inventive Computing and Informatics (ICICI 2017), IEEE, 2017, pp. 944-948.
Dey, "A Contour based Procedure for Face Detection and Tracking from Video," 3rd Int'l Conf. on Recent Advances in Information Technology, RAIT-2016, 2016, 6 pages total.
Hu et al., "Face Detection based on SSD and CamShift," ITAIC 2020, 2020, pp. 2324-2328.
Karahan et al., "Autonomous Face Detection and Tracking Using Quadrotor UAV," IEEE, 2020, 4 pages total.
Ren et al., "A Face Tracking Framework Based on Convolutional Neural Networks and Kalman Filter," IEEE, 2017, pp. 410-413.
Wu et al., "Research of People Counting Based on Face Detection and Area-Tracking," 2013 3rd International Conference on Computer Science and Network Technology, IEEE, 2013, pp. 525-528.
Taiwanese Office Action and Search Report for Taiwanese Application No. 110142197, dated Aug. 3, 2022.

* cited by examiner

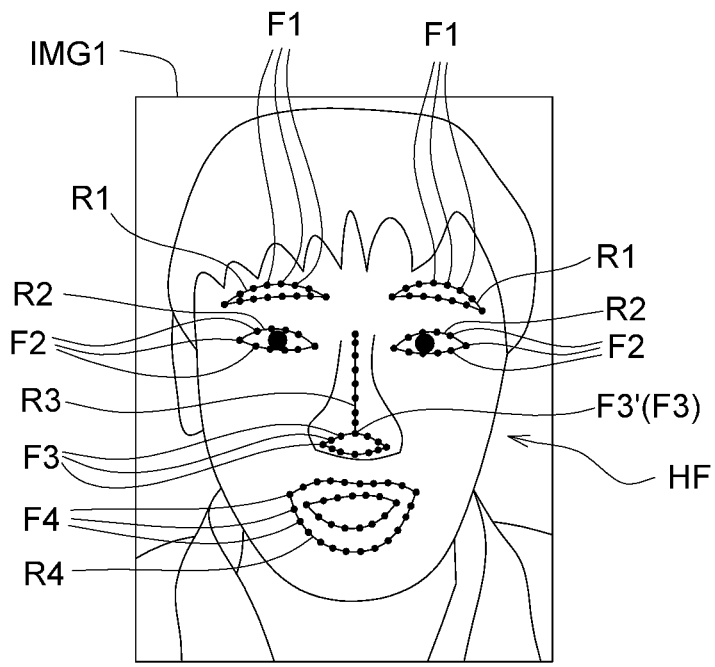
FIG. 9A
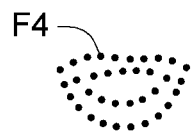
FIG. 9B
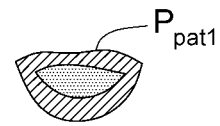
FIG. 9C
160
| Search for a reference area according to the feature areas, and retrieve a reference feature point from the reference area | — 161 |
↓
| Obtain a depth value corresponding to the reference feature point | — 162 |
↓
| Transform coordinates of the target feature points into the projection coordinate using the calibration information corresponding to the depth value | — 163 |
FIG. 10

VISUAL RECOGNITION BASED METHOD AND SYSTEM FOR PROJECTING PATTERNED LIGHT, METHOD AND SYSTEM APPLIED TO ORAL INSPECTION, AND MACHINING SYSTEM

This application claims the benefit of U.S. provisional application No. 63/213,256, filed Jun. 22, 2021, and the benefit of Taiwan application Ser. No. 110142197, filed Nov. 12, 2021, the subject matters of which are incorporated herein by references.

TECHNICAL FIELD

The disclosure relates in general to a method and system for projecting patterned light, a method and system applied to oral inspection, and a machining system, and more particularly to a visual recognition based method and system for projecting patterned light, a method and system applied to oral inspection, and a machining system.

BACKGROUND

In case of insufficient light, it is usually necessary to use a light source to provide light to a specific area in order to clearly identify the situation of the specific area of an object. However, the light pattern of the light source is generally in a single shape; if it is desired to produce another light pattern of the light effect by using the same light source, a light shield is required. If it is desired to produce a number of different light patterns of the light effect, a variety of different designs of light shields are required to change the light pattern for the same light source.

In view of the above, there is a need for a method, system for projecting patterned light, a method and system applied to oral inspection, and a machining system that may produce different forms of light effects depending on the application requirements, such as generating light effect with specific light pattern, or achieving guiding and assisting functions with light effect having specific light pattern.

SUMMARY

The disclosure is directed to a visual recognition based method and system for projecting patterned light, a method and system applied to oral inspection, and a machining system to solve the aforementioned problems.

According to one embodiment, a visual recognition based method for projecting patterned light is provided. The method for projecting patterned light includes the following steps. First, a calibration image is projected onto a projection screen by a projection module. Then, the calibration image is captured by an image-capturing module to obtain a calibration information between the projection module and the image-capturing module. Next, an object is captured by the image-capturing module to obtain a to-be-recognized image of the object. The object in the to-be-recognized image is detected and a plurality of feature points associated with a plurality of feature areas of the object in the to-be-recognized image are acquired. A plurality of target feature points corresponding to a target object are retrieved from the feature points. Afterwards, a projection coordinate of the target feature points is obtained according to the calibration information and is provided to the projection module. A projection pattern with shape corresponding to the target object is projected onto the object by the projection module according to the projection coordinate.

According to another embodiment, a visual recognition based system for projecting patterned light is provided. The system for projecting patterned light is provided with a calibration mode and a projection mode, and includes a projection module, an image-capturing module and a processor. The projection module is configured for projecting a calibration image onto a projection screen in the calibration mode. The image-capturing module is configured for capturing the calibration image in the calibration mode, and capturing an object in the projection mode to obtain a to-be-recognized image of the object. The processor is coupled to the projection module and the image-capturing module and configured for, in the calibration mode, obtaining a calibration information between the projection module and the image-capturing module according to the captured calibration image, and, in the projection mode, detecting the object in the to-be-recognized image, acquiring a plurality of feature points associated with a plurality of feature areas of the object in the to-be-recognized image, retrieving a plurality of target feature points corresponding to a target object from the feature points, obtaining a projection coordinate of the target feature points according to the calibration information and providing the projection coordinate to the projection module, and commanding the projection module to project a projection pattern with shape corresponding to the target object onto the object according to the projection coordinate.

According to still another embodiment, a method applied to oral inspection is provided. The method applied to oral inspection includes the following steps. First, a calibration image is projected onto a projection screen by a projection module. Then, the calibration image is captured by an image-capturing module to obtain a calibration information between the projection module and the image-capturing module. Next, a human's face is captured by the image-capturing module to obtain a to-be-recognized image of the human's face. The human's face in the to-be-recognized image is detected and a plurality of feature points associated with a plurality of facial features of the human's face in the to-be-recognized image are acquired. A plurality of mouth feature points corresponding to a human's mouth are retrieved from the feature points. Afterwards, a projection coordinate of the mouth feature points is obtained according to the calibration information and is provided to the projection module. A projection pattern with shape corresponding to the human's mouth is projected onto the human's face by the projection module according to the projection coordinate.

According to a further embodiment, a system applied to oral inspection is provided. The system applied to oral inspection is provided with a calibration mode and a projection mode, and includes a projection module, an image-capturing module and a processor. The projection module is configured for projecting a calibration image onto a projection screen in the calibration mode. The image-capturing module is configured for capturing the calibration image in the calibration mode, and capturing a human's face in the projection mode to obtain a to-be-recognized image of the human's face. The processor is coupled to the projection module and the image-capturing module and configured for, in the calibration mode, obtaining a calibration information between the projection module and the image-capturing module according to the captured calibration image, and, in the projection mode, detecting the human's face in the to-be-recognized image, acquiring a plurality of feature points associated with a plurality of facial features of the human's face in the to-be-recognized image, retrieving a plurality of mouth feature points corresponding to a human's mouth from the feature points, obtaining a projection coordinate of the mouth feature points according to the calibration information and providing the projection coordinate to the projection module, and commanding the projection module to project a projection pattern with shape corresponding to the human's mouth onto the human's face according to the projection coordinate.

According to a further embodiment, a machining system is provided. The machining system is provided with a calibration mode and a projection mode, and includes a robotic arm, a projection module, an image-capturing module and a processor. The robotic arm is configured for machining a workpiece along a machining path. The projection module is configured for projecting a calibration image onto a projection screen in the calibration mode. The image-capturing module is configured for capturing the calibration image in the calibration mode, and capturing the workpiece in the projection mode to obtain a to-be-recognized image of the workpiece. The processor is coupled to the projection module and the image-capturing module and configured for, in the calibration mode, obtaining a calibration information between the projection module and the image-capturing module according to the captured calibration image, and, in the projection mode, detecting the workpiece in the to-be-recognized image, acquiring a plurality of feature points associated with a plurality of feature areas of the workpiece in the to-be-recognized image, retrieving a plurality of target feature points corresponding to the machining path according to the feature points, obtaining a projection coordinate of the target feature points according to the calibration information and providing the projection coordinate to the projection module, and commanding the projection module to project a machining path pattern onto the workpiece according to the projection coordinate.

The above and other embodiments of this disclosure will become better understood with regard to the following detailed description. The following description is made with reference to the accompanying drawings.

BRIEF DESCRIPTION OF THE DRAWINGS

FIG. 9A shows a to-be-recognized image when the object is a face.

FIG. 9B shows a plurality of target feature points corresponding to the mouth.

FIG. 9C shows a projection pattern with shape corresponding to the mouth.

FIG. 10 is the step of obtaining the projection coordinate of the target feature points according to the calibration information and providing the projection coordinate to the projection module according to one embodiment of the disclosure.

DETAILED DESCRIPTION

In the present disclosure, a projection pattern with specific shape is produced for a specific area of an object by a projection module, and the projection pattern is projected onto the object so as to generate light effect with specific light pattern, or achieve guiding and assisting functions with light effect having specific light pattern.

Each embodiment of the disclosure will be described in detail below and illustrated with drawings. In addition to these detailed descriptions, the disclosure may be broadly implemented in other embodiments, and any easy substitution, modification, or equivalent variation of the described embodiments is included in the scope of the disclosure and is covered by the scope of the claims thereafter. In the description of the specification, many specific details and examples of embodiments are provided to provide the reader with a more complete understanding of the disclosure; however, these specific details and examples of embodiments should not be considered as limitations of the disclosure. In addition, well known steps or elements are not described in detail to avoid unnecessary limitations of the disclosure.

Figure 1:
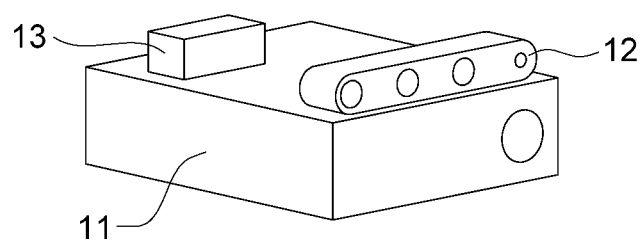
FIG. 1 is a schematic diagram of a system for projecting patterned light according to one embodiment of the disclosure.
Figure 2:
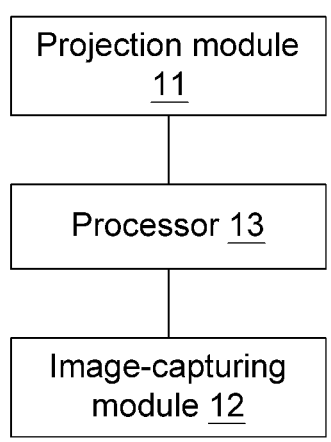
FIG. 2 is a block diagram of the system for projecting patterned light according to one embodiment of the disclosure.

FIG. 1 is a schematic diagram of a system 10 for projecting patterned light according to one embodiment of the disclosure. FIG. 2 is a block diagram of the system 10 for projecting patterned light according to one embodiment of the disclosure. Referring to FIG. 1 and FIG. 2, the system 10 for projecting patterned light includes a projection module 11, an image-capturing module 12 and a processor 13. The projection module 11 and the image-capturing module 12 are coupled to the processor 13, respectively. As shown in FIG. 1, the projection module 11, the image-capturing module 12 and the processor 13 are all-in-one, but the present disclosure is not limited thereto. In one specific embodiment, the image-capturing module may be a depth camera. In another specific embodiment, the projection module 11 and the image-capturing module 12 may be all-in-one, and the processor 13 may be disposed on another body.

In the embodiments, the projection module 11, such as but not limited to, an optical projection device or a digital projection device, may project a projected image. The field of view of the image-capturing module 12 may cover the projected image projected by the projection module 11, which may be based on active measurement, such as scattered structured light, phase structured light or time of flight (TOF) technology; it may also be based on passive measurement, such as stereo vision technology by using dual-camera. Herein, the relative position of the projection module 11 and the image-capturing module 12 is not limited to the configuration shown in FIG. 1, as long as the field of view of the image-capturing module 12 for capturing images may cover the area of the projected image projected by the projection module 11.

Figure 3:
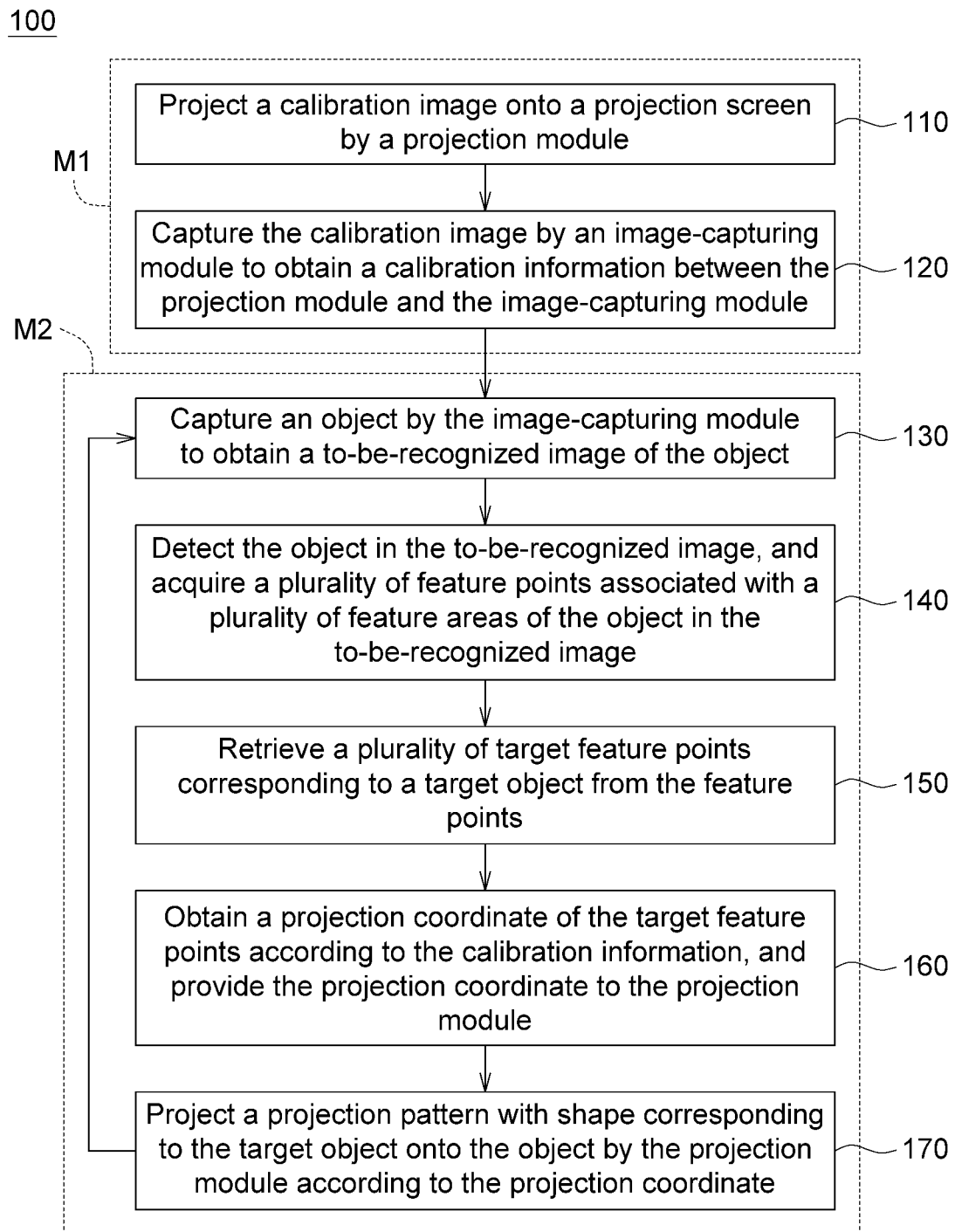
FIG. 3 is a flowchart of a method for projecting patterned light according to one embodiment of the disclosure.

FIG. 3 is a flowchart of a method 100 for projecting patterned light according to one embodiment of the disclosure. Referring to FIG. 1, FIG. 2 and FIG. 3, the system 10 for projecting patterned light may be provided with a calibration mode M1 and a projection mode M2. First, when first used or when necessary, the system 10 for projecting patterned light enters the calibration mode M1 to ensure that the projection pattern produced by the projection module 11 is accurately projected onto the object in a specific shape.

In step 110, the projection module 11 projects a calibration image onto a projection screen. Next, in step 120, the image-capturing module 12 captures the calibration image to obtain a calibration information between the projection module 11 and the image-capturing module 12.

Figure 4A:
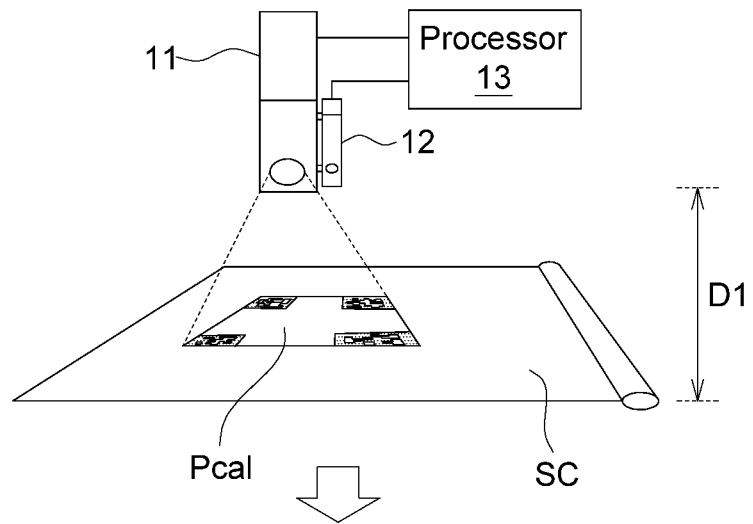
FIG. 4A is a schematic diagram showing the calibration image is projected onto the projection screen at a projection distance.
Figure 4B:
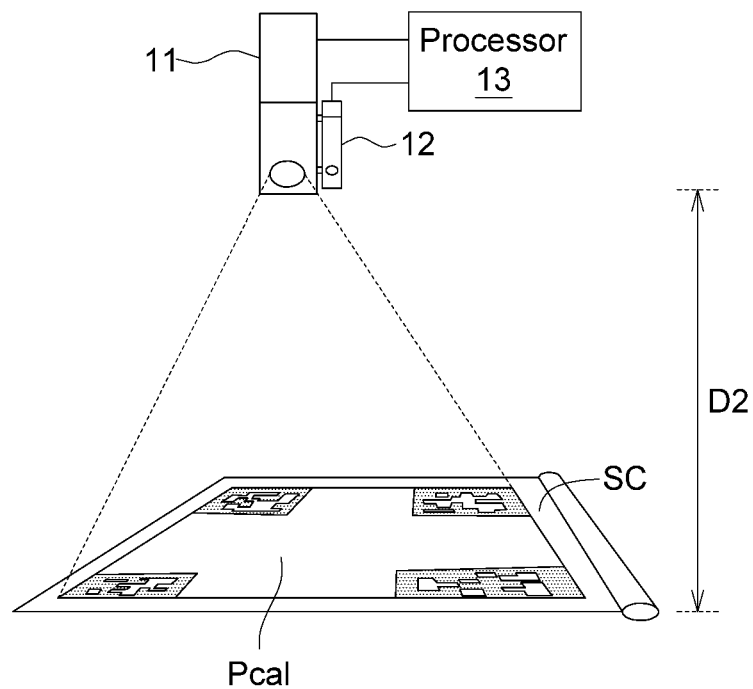
FIG. 4B is a schematic diagram showing the calibration image is projected onto the projection screen at another projection distance.
Figure 5A:
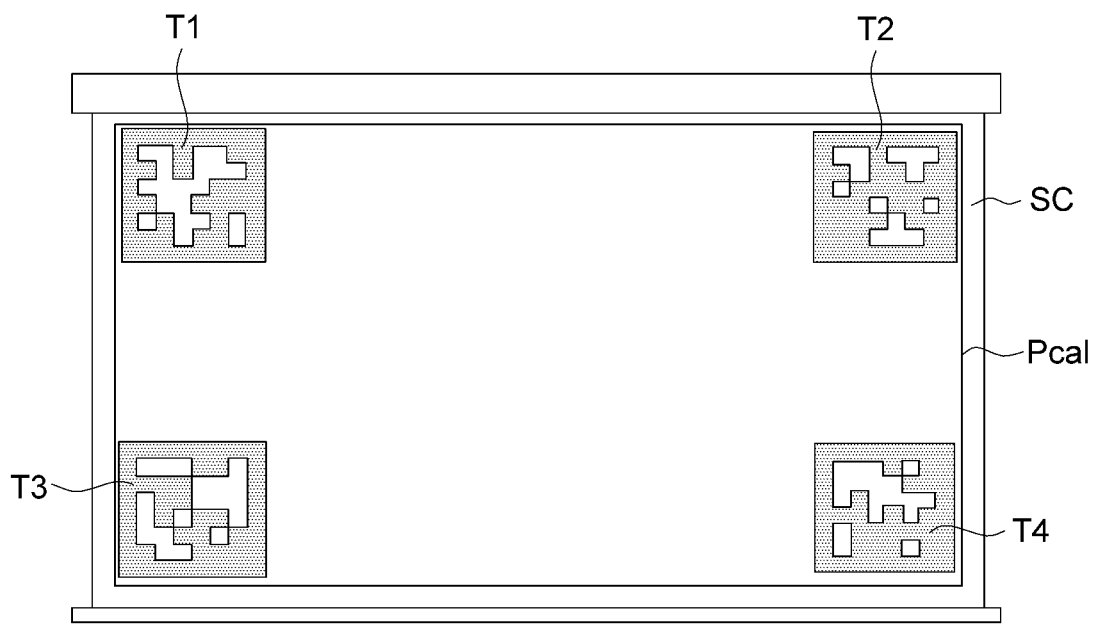
FIG. 5A is a schematic diagram of the calibration image according to one embodiment of the disclosure.

FIG. 4A is a schematic diagram showing the calibration image Pcal is projected onto the projection screen SC at a projection distance D1. FIG. 4B is a schematic diagram showing the calibration image Pcal is projected onto the projection screen SC at another projection distance D2. FIG. 5A is a schematic diagram of the calibration image Pcal according to one embodiment of the disclosure.

Referring to FIG. 4A and FIG. 4B, when the system 10 for projecting patterned light is in the calibration mode M1, the projection module 11 may project the calibration image Pcal onto the projection screen SC at different projection distances (e.g. projection distance D1, D2 . . . etc.). Furthermore, at each projection distance, the image-capturing module 12 captures the calibration image Pcal projected by the projection module 11, and transmits the captured image to the processor 13 for computation to obtain a calibration matrix corresponding to the projection distance. That is to say, the processor 13 may obtain a plurality of calibration matrixes corresponding to different projection distances, so as to take the calibration matrixes corresponding to different projection distances as the calibration information between the projection module 11 and the image-capturing module 12. For example, as shown in FIG. 4A, the projection module 11 may at first project the calibration image Pcal at a projection distance D1, and after calculation, the processor 13 may obtain a calibration matrix corresponding to the projection distance D1. Next, the projection screen SC may be moved in the direction of the arrow shown in FIG. 4A. As shown in FIG. 4B, the projection module 11 projects the calibration image Pcal at another projection distance D2, and after calculation, the processor 13 may obtain a calibration matrix corresponding to the projection distance D2. Then, the calibration matrixes corresponding to other different projection distances may be obtained in the same way as described above.

Figure 5B:
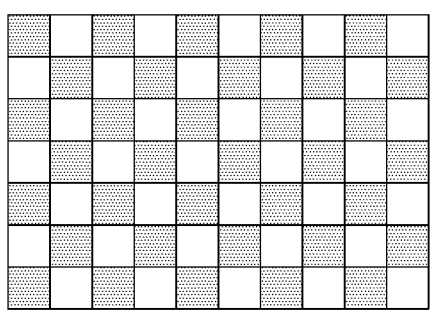
FIG. 5B is a schematic diagram of a calibration image according to another embodiment of the disclosure.
Figure 5C:
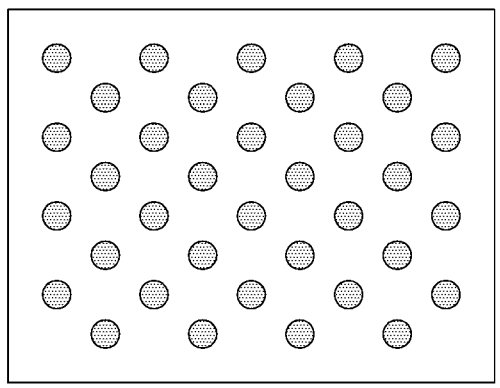
FIG. 5C is a schematic diagram of a calibration image according to still another embodiment of the disclosure.

FIG. 5B and FIG. 5C are schematic diagrams of calibration images Pcal', Pcal" according to different embodiments. The calibration images Pcal, Pcal', Pcal" are visual calibration boards. In one embodiment, the calibration image Pcal projected by the projection module 11 may be illustrated as shown in FIG. 5A. Referring to FIG. 5A, the visual calibration board is a binary calibration board, and the calibration image Pcal may include a plurality of graphic labels T1, T2, T3, T4 respectively disposed in corners of the calibration image Pcal. In the embodiment of FIG. 5A, the calibration image is a binary calibration board including the graphic labels T1, T2, T3, T4 which are AprilTags, for example, but the present disclosure is not limited thereto. In other embodiments not illustrated, the graphic labels T1, T2, T3, T4 may be, but not limited to two-dimensional barcodes such as QR code, Aztec code, Aruco code. In the example of FIG. 5B, the visual calibration board may be a calibration image Pcal' which is a checkerboard calibration board. In the embodiment of FIG. 5C, the visual calibration board may be a calibration image Pcal" which is a dot calibration board. The embodiment of FIG. 5A will be described below. In the embodiment of FIG. 5A, when the image-capturing module 12 captures the calibration image Pcal projected by the projection module 11, the processor 13 may precisely identify each of the graphic labels T1, T2, T3, T4 and their positions from the image captured by the image-capturing module 12.

Figure 6:
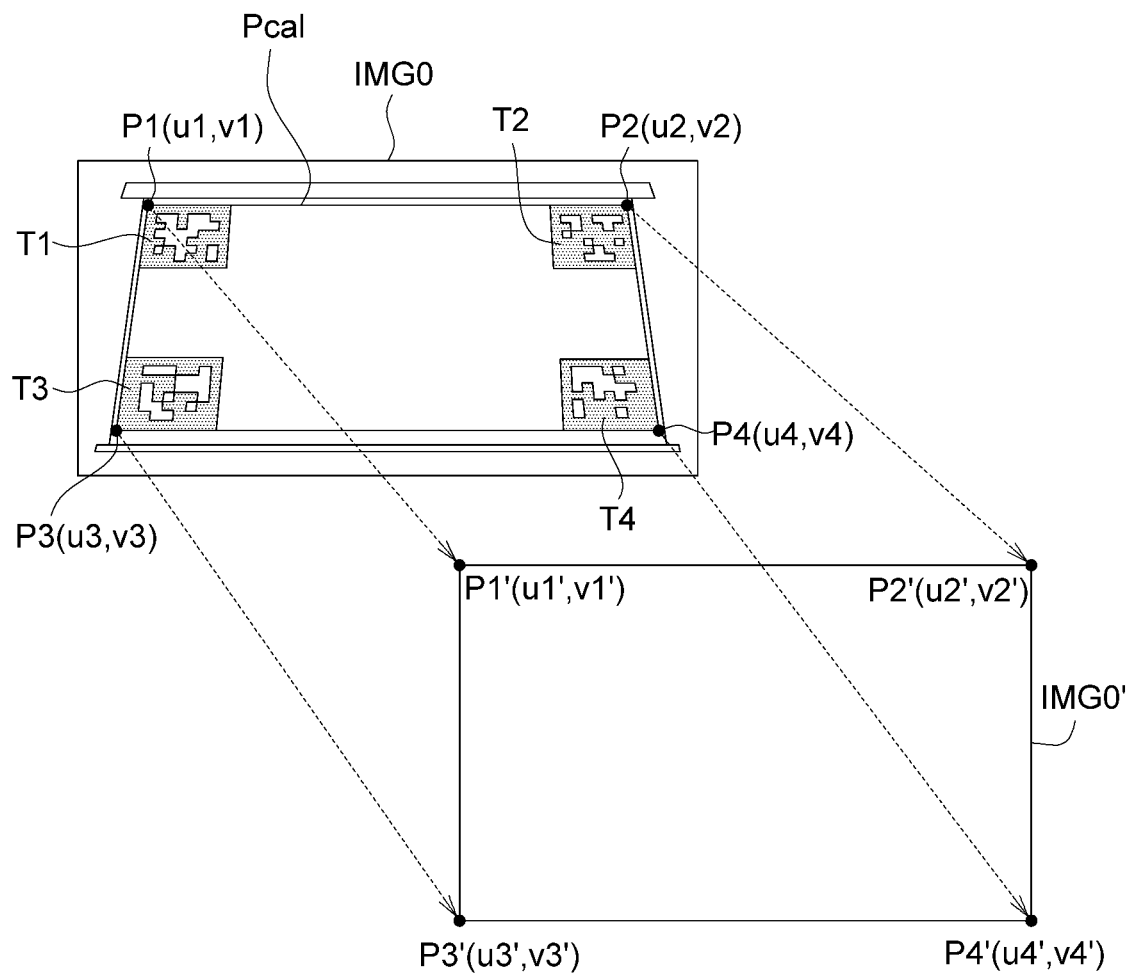
FIG. 6 is a schematic diagram showing the step of obtaining the calibration information between the projection module and the image-capturing module according to one embodiment of the disclosure.

FIG. 6 is a schematic diagram showing the step 120 of obtaining the calibration information between the projection module 11 and the image-capturing module 12 according to one embodiment of the disclosure. Referring to FIG. 2 and FIG. 6, FIG. 6 shows an image IMG0, captured by the image-capturing module 12, of the calibration image Pcal projected by the projection module 11 at a projection distance, for example, at a projection distance D2 as shown in FIG. 4B. The image IMG0 is then transmitted to the processor 13, and the processor 13 identifies the graphic labels T1, T2, T3, T4 according to the calibration image Pcal in the image IMG0. Next, the precossor 13 may obtain coordinates (u1,v1), (u2,v2), (u3,v3), (u4,v4) of a plurality of alignment points P1, P2, P3, P4 which the identified graphic labels T1, T2, T3, T4 correspond to, so as to form a first coordinate system. The alignment points P1, P2, P3, P4 may respectively be one of the corner feature points of the graphic labels T1, T2, T3, T4. For example, the alignment point P1 is a corner feature point in the upper left corner of the graphic label T1, the alignment point P2 is a corner feature point in the upper right corner of the graphic label T2, the alignment point P3 is a corner feature point in the lower left corner of the graphic label T3, and the alignment point P4 is a corner feature point in the lower right corner of the graphic label T4. The coordinates (u1,v1), (u2,v2), (u3,v3), (u4,v4) of the alignment points P1, P2, P3, P4 are pixel coordinates corresponding to the alignment points P1, P2, P3, P4, respectively. In the present embodiment, since it is desired to obtain a larger projection area, the graphic labels T1, T2, T3, T4 are placed in the largest area of the projection screen SC (i.e., the four corners), and the connecting lines of the selected four alignment points P1, P2, P3, P4 correspond to the largest projection area. However, the graphic labels T1, T2, T3 and T4 may be placed according to the required actual projection area, and the number of graphic labels may also be changed. Similarly, the selection of alignment points is not limited to the four alignment points P1, P2, P3 P4 in the present embodiment, but the position and number of alignment points may be chosen according to the actual needs.

Next, the processor 13 may obtain coordinates (u1',v1'), (u2',v2'), (u3',v3'), (u4',v4') of a plurality of reference points P1', P2', P3', P4' of a standard screen IMG0', so as to form a second coordinate system. The reference points P1', P2', P3', P4' may be located in the corners of the standard screen IMG0'. The standard screen IMG0' may, for example, be an image with 1280×720 resolution, but the present disclosure is not limited thereto. Then, the processor 13 may transform the coordinates (u1,v1), (u2,v2), (u3,v3), (u4,v4) of the alignment points P1, P2, P3, P4 and the coordinates (u1', v1'), (u2',v2'), (u3',v3'), (u4',v4') of the reference points P1', P2', P3', P4'. For example, the processor 13 performs homography transformation between the first coordinate system and the second coordinate system to create a calibration matrix. In addition, the processor 13 may know that the calibration matrix is a calibration matrix corresponding to the projection distance D2 based on the function of the image-capturing module 12 of obtaining the depth value. Afterwards, the system 10 for projecting patterned light may create calibration matrixes for different projection distances in the manner described above. For example, calibration matrixes are created with distances in every five centimeters and stored for the system 10 for projecting patterned light to use in the projection mode M2.

Figure 7A:
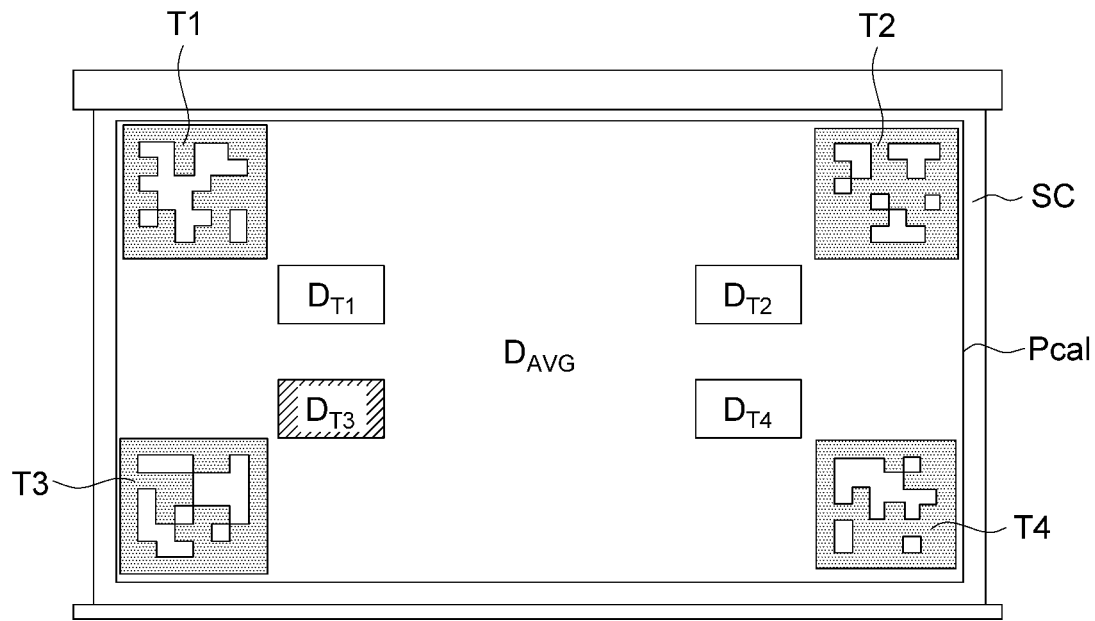
FIG. 7A and FIG. 7B are schematic diagrams showing the depth values of the graphic labels are projected onto the projection screen according to one embodiment of the disclosure.
Figure 7B:
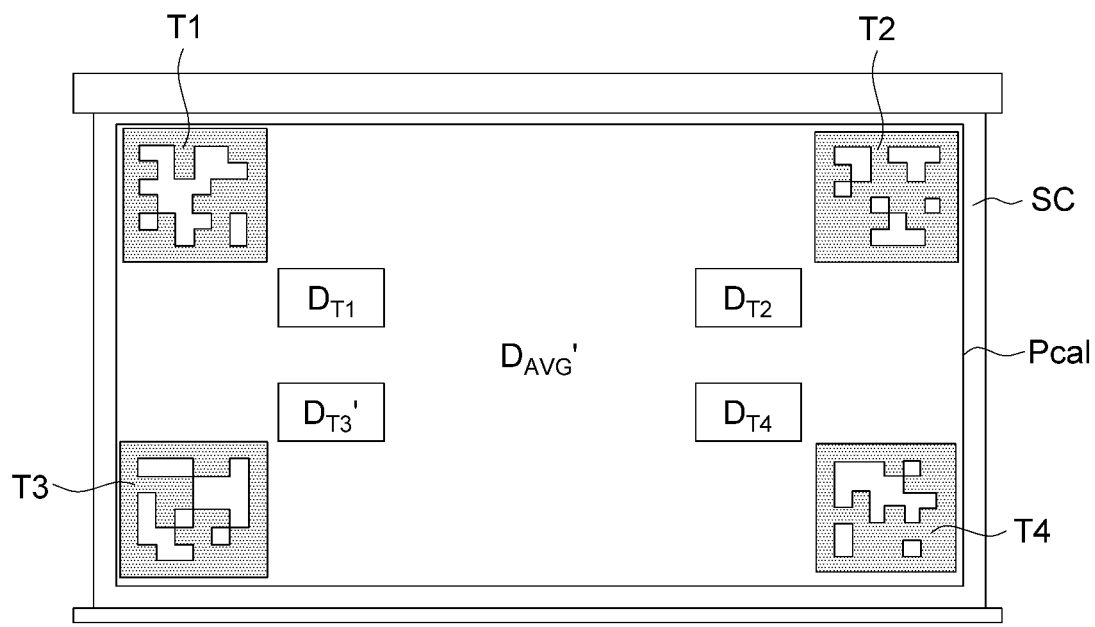

On the other hand, in other embodiments, when the system 10 for projecting patterned light is in the calibration mode M1, the projection module 11 may further project each depth value of each graphic label T1, T2, T3, T4 at the current projection distance onto the projection screen SC for checking whether the projection screen SC is coplanar or skewed, which may get an incorrect calibration matrix. Referring to FIG. 7A and FIG. 7B, which are schematic diagrams showing the depth values $D_{T1}$, $D_{T2}$, $D_{T3}$, $D_{T4}$ of the graphic labels T1, T2, T3, T4 are projected onto the projection screen SC according to one embodiment of the disclosure. First, the processor 13 may respectively obtain depth values of the graphic labels T1, T2, T3, T4 from the image-capturing module 12. For example, the processor 13 may average the depth values of the four corner feature points of the graphic label T1 to obtain the depth value $D_{T1}$ of the graphic label T1, and average the depth values of the four corner feature points of the graphic label T2 to obtain the depth value $D_{T2}$ of the graphic label T2; the depth value $D_{T3}$ and the depth value $D_{T4}$ are obtained in the same way and are not repeated here. Then, the processor 13 may calculate an average depth information $D_{AVG}$ based on the depth values $D_{T1}$, $D_{T2}$, $D_{T3}$, $D_{T4}$. Next, the processor 13 may command the projection module 11 to project the depth values $D_{T1}$, $D_{T2}$, $D_{T3}$, $D_{T4}$ and the average depth information $D_{AVG}$ onto the projection screen SC. Since the difference between the depth value $D_{T3}$ of the graphic label T3 and the average depth information $D_{AVG}$ is greater than a threshold value, this depth value is designated, as shown in FIG. 7A. In this way, the adjuster may realize a possible skew of the projection screen SC and adjust the position of the projection screen SC in relation to the projection module 11 in time to make the difference within an acceptable threshold value, as shown in FIG. 7B, where the depth value $D_{T3}'$ of the graphic label T3 meets the condition. Once the differences between all depth values $D_{T1}$, $D_{T2}$, $D_{T3}'$, $D_{T4}$ and the average depth information $D_{AVG}'$ are within the threshold value, the processor 13 may obtain the coordinates of the alignment points.

In accordance with the above description, the calibration screen Pcal is projected onto the projection screen SC by the projection module 11, preventing the inconvenience of using a physical calibration board. For example, if a physical calibration board is used for calibration, the calibration effect and calibration quality are often affected by the uncontrolled ambient light source, which may in turn affect the accuracy of the projection module 11 when the projection module 11 is in the projection mode M2 later. Moreover, since the calibration screen Pcal may be projected by the projection module 11, different calibration screen Pcal may be changed quickly according to the demand. Furthermore, in one embodiment of the present disclosure, the graphic labels T1-T4 are used in the calibration screen Pcal, and each corner feature point of the graphic labels T1-T4 is provided with a unique code and thus may be accurately recognized, so that the projection module 11 may accurately and steadily project the projection pattern onto a specific area of the object when using the calibration information obtained from the calibration screen Pcal. In contrast, the checkerboard or the dot calibration board has fixed size and arrangement, and only a rough idea of whether the corrected distortion parameters are correct can be obtained during calibration, while other camera parameters cannot be verified, which may affect the accuracy of subsequent projection of the projection module 11.

After the calibration mode M1 is completed, as shown in FIG. 3, the system 10 for projecting patterned light enters the projection mode M2. In step 130, the image-capturing module 12 captures an object to obtain a to-be-recognized image of the object.

Figure 8:
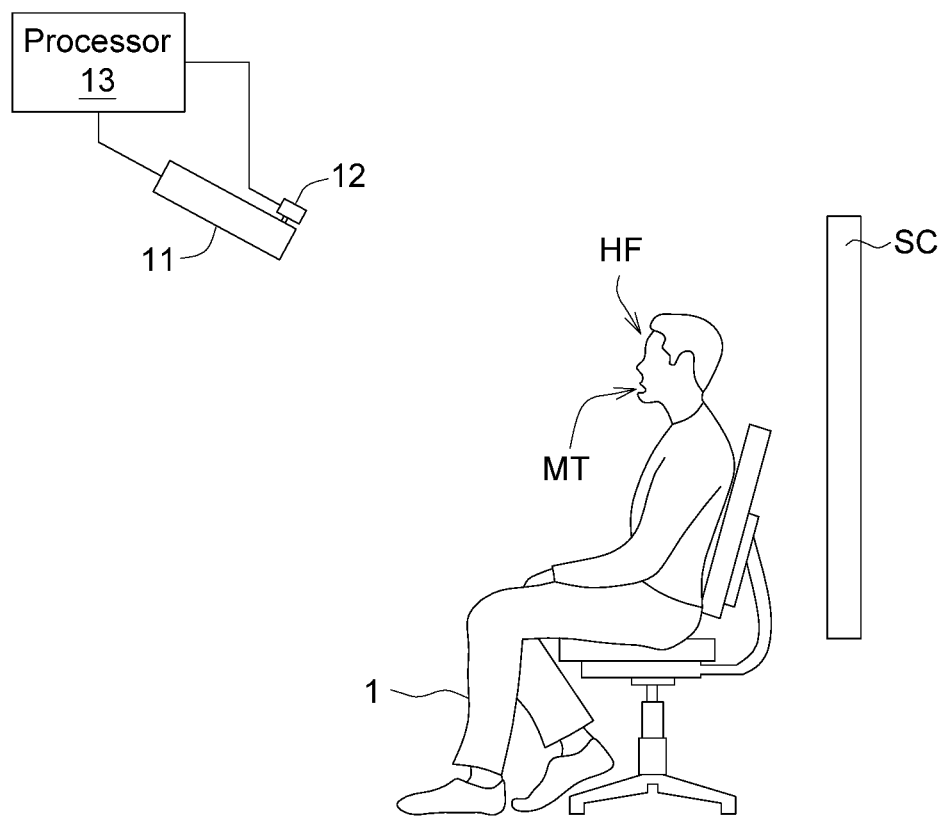
FIG. 8 is an example showing the object is a face.

FIG. 8 is an example showing the object is a face HF. FIG. 9A shows a to-be-recognized image IMG1 when the object is a face HF. Referring to FIG. 8 and FIG. 9A, in the present embodiment, the face HF is, for example, the human's face. If an object (e.g., a static or dynamic object, for example, a person 1 in the present embodiment) appears in the field of view of the image-capturing module 12, the image-capturing module 12 may obtain the to-be-recognized image IMG1 of the face HF of the object (e.g., person 1) and input the to-be-recognized image IMG1 to the processor 13.

Referring to FIG. 3, in step 140, the processor 13 detects the object in the to-be-recognized image IMG1, and acquires a plurality of feature points associated with a plurality of feature areas of the object in the to-be-recognized image. Referring to FIG. 9A, the processor 13 may identify the feature areas associated with the face HF based on the visual recognition algorithm. The feature areas are, for example, facial features, such as eyebrow area R1, eye area R2, nose area R3, and mouth area R4. Each feature area may be composed of a plurality of feature points, e.g., the eyebrow area R1 is composed of a plurality of eyebrow feature points F1, the eye area R2 is composed of a plurality of eye feature points F2, the nose area R3 is composed of a plurality of nose feature points F3, and the mouth area R4 is composed of a plurality of mouth feature points F4. Here, the visual recognition algorithm is a face visual recognition algorithm, which may, but not limited to, carry out the recognition of five facial senses through a pre-trained model such as LeNet, AlexNet, VGGnet, NIN, GoogLeNet, MobileNet, SqueezeNet, ResNet, SiameseNet, NASNet and RNN, so as to find out the feature points (eyebrow feature points F1, eye feature points F2, nose feature points F3 and mouth feature points F4) associated with the facial features (eyebrow area R1, eye area R2, nose area R3, and mouth area R4) of the face HF.

Referring to FIG. 3, next, in step 150, the processor 13 retrieves a plurality of target feature points corresponding to a target object from the feature points F1, F2, F3, F4. In the embodiment of FIG. 8, if the target object is the mouth MT (such as the human's mouth), a plurality of mouth feature points F4 corresponding to the mouth MT are shown in FIG. 9B. The processor 13 selects the mouth feature points F4 from the feature points F1, F2, F3, F4 that have the greatest similarity to the category of mouth MT as the target feature points, and obtains the coordinates of the mouth feature points F4.

Referring to FIG. 3, in step 160, the processor 13 obtains a projection coordinate of the target feature points according to the calibration information, and provides the projection coordinate to the projection module 11. In calibration mode M1, calibration matrixes are created for different projection distances, and these calibration matrixes are stored as the calibration information. Therefore, in this step, if the depth of the target feature points relative to the image-capturing module 12 is known, the coordinates of the target feature points may be converted to the projection coordinate of the projection module 11 using the calibration matrix corresponding to this depth.

Furthermore, FIG. 10 is the step 160 of obtaining the projection coordinate of the target feature points according to the calibration information and providing the projection coordinate to the projection module 11 according to one embodiment of the disclosure. Referring to FIG. 10, in step 161, the processor 13 searches for a reference area according to the feature areas, and retrieves a reference feature point from the reference area. For example, referring to FIG. 9A, the processor 13 may search for the reference area from the facial features so as to regard the nose area R3 as the reference area, and retrieve a feature point of a nose tip F3' from the nose area R3 as the reference feature point.

Next, referring to FIG. 10, in step 162, the processor 13 obtains a depth value corresponding to the reference feature point. Referring to FIG. 9A, in one embodiment, the processor 13 may obtain the depth values of the nose area R3 of the person 1 through the image-capturing module 12 so as to acquire the depth value of the feature point of the nose tip F3'. The image-capturing module 12 may first obtain the image coordinates of each nose feature point F3 of the nose area R3 in the to-be-recognized image IMG1, and convert the image coordinates into camera coordinates through intrinsic parameters. Thus, the depth value of each nose feature point F3 relative to the image-capturing module 12 may be obtained, and the depth value of the feature point of the nose tip F3' may be acquired.

Afterwards, referring to FIG. 10, in step 163, the processor 13 transforms coordinates of the target feature points into the projection coordinate using the calibration information corresponding to the depth value. Referring to FIG. 9A and FIG. 9B, in one embodiment, the processor 13 may select the calibration matrix corresponding to the depth value of the feature point of the nose tip F3' from the stored calibration matrixes, and use the calibration matrix to transform the image coordinates of the mouth feature points F4 into the projection coordinate, and provide the projection coordinate to the projection module 11.

Generally speaking, since the mouth MT often opens and closes, if a calibration matrix corresponding to the depth value of the mouth feature points F4 is selected, it is possible to select an incorrect calibration matrix due to the opening and closing of the mouth MT, resulting in the transformation to the wrong projection coordinate. Therefore, in the embodiment, the calibration matrix corresponding to the depth value of the nose feature points F3 is selected, and the calibration matrix corresponding to the depth value of the feature point of the nose tip F3' is further selected, which may result in a more stable projection coordinate than the calibration matrix corresponding to the depth value of the mouth feature points F4. In addition, since the height difference between the five facial senses of the face HF is not noticeable, the calibration matrix corresponding to the depth value of the feature point of the nose tip F3' is still applicable to the transformation of the coordinates of the mouth feature points F4.

Figure 11:
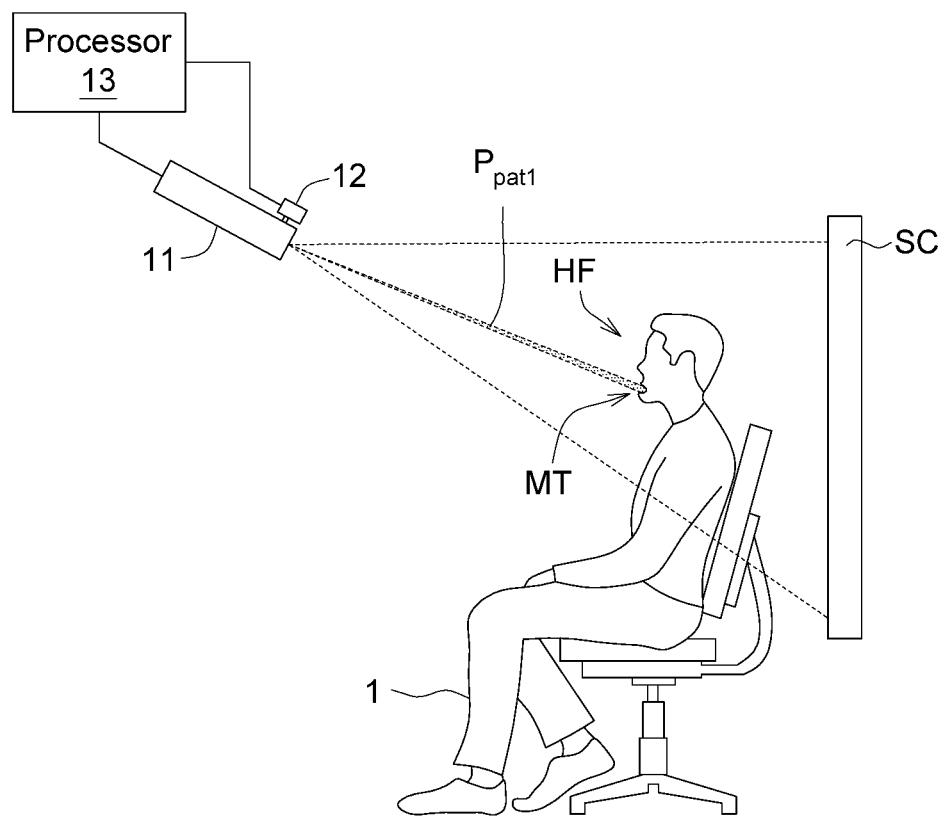
FIG. 11 is a schematic diagram showing the projection pattern is projected onto the face.

FIG. 11 is a schematic diagram showing the projection pattern $P_{pat1}$ is projected onto the face HF. Referring to FIG. 3 and FIG. 11, after the projection coordinate is obtained, in step 170, the projection module 11 projects a projection pattern $P_{pat1}$ with shape corresponding to the target object (e.g., the mouth MT) onto the object (e.g. the face HF) according to the projection coordinate. As shown in FIG. 9C, a projection pattern $P_{pat1}$ with shape corresponding to the mouth MT is shown. Referring to FIG. 9C and FIG. 11, the projection module 11 may generate the light effect with the projection pattern $P_{pat1}$ for the area of the mouth MT, and does not project light to the remaining area other than the mouth MT, so that the projection module 11 may, for a specific area of the face HF, project the projection pattern $P_{pat1}$ with shape corresponding to the mouth MT onto the face HF, so as to generate light effect with specific light pattern.

Referring to FIG. 3, later in the projection mode M2, the steps 130-170 are repeated to continuously track the target object automatically, and the projection module 11 continuously follows the position of the target object to project a corresponding projection pattern on the object.

Figure 12:
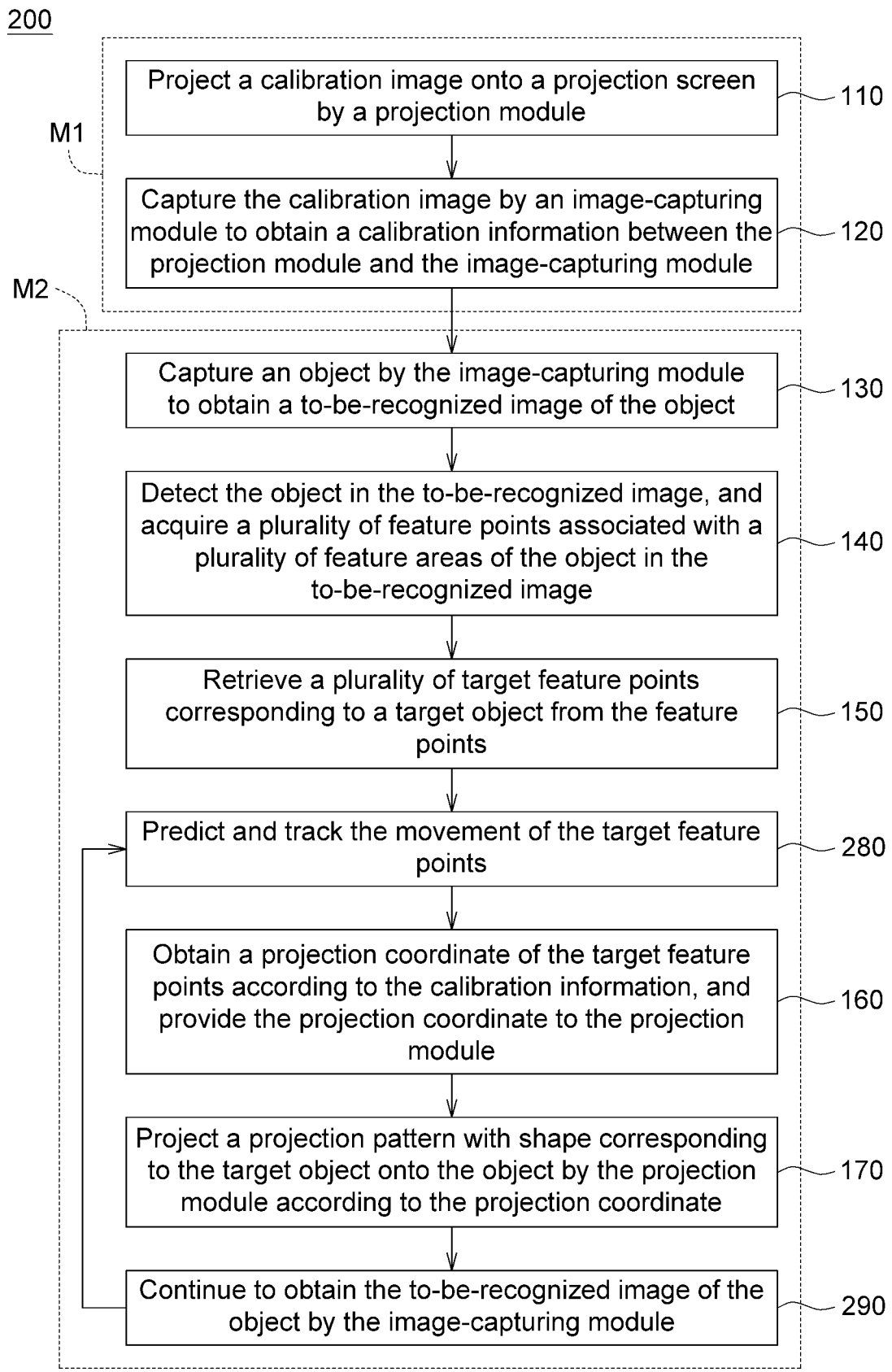
FIG. 12 is a flowchart of a method for projecting patterned light according to another embodiment of the disclosure.

FIG. 12 is a flowchart of a method 200 for projecting patterned light according to another embodiment of the disclosure. Referring to FIG. 12, compared to the embodiment in FIG. 3, in the projection mode M2 of the present embodiment after the step 150 of retrieving a plurality of target feature points corresponding to a target object, the method further includes the step 280 of predicting and tracking the movement of the target feature points. In one embodiment, the processor 13 may predict the location and direction of the target feature points based on image tracking algorithms, such as the Kalman filter. For example, in FIG. 9A, the processor 13 may predict the movement of the mouth feature points F4 to effectively reduce the detection range of the to-be-recognized image IMG1. In addition, in the step 290 after the step 170, the image-capturing module 12 continues to obtain the to-be-recognized image of the object, and then continues the predicting and tracking in step 280 to continue to dynamically track the target feature points in the field of view of the image-capturing module 12.

Furthermore, in the preceding embodiment, if the detection of the object in the to-be-recognized image in the step 140 of FIG. 3 and FIG. 12 fails, the processor 13 may adjust the brightness of the to-be-recognized image. For example, if the brightness of the current environment is too dark to allow the processor 13 to perform image recognition to acquire the feature points associated with the feature areas of the object, the processor 13 may, based on the image processing algorithm, increase the brightness for all areas of the to-be-recognized image or for local areas of the to-be-recognized image to obtain a to-be-recognized image after adjusted. Conversely, if the brightness of the current environment is too bright, the processor 13 may decrease the brightness of the to-be-recognized image based on the image processing algorithm. In this way, even if the brightness of the current environment is not conducive to image recognition, the brightness of the to-be-recognized image may be adjusted according to the image processing method without affecting the actual ambient light source, thus ensuring the accuracy of the detection of the feature points or the target feature points in the to-be-recognized image.

Figure 13A:
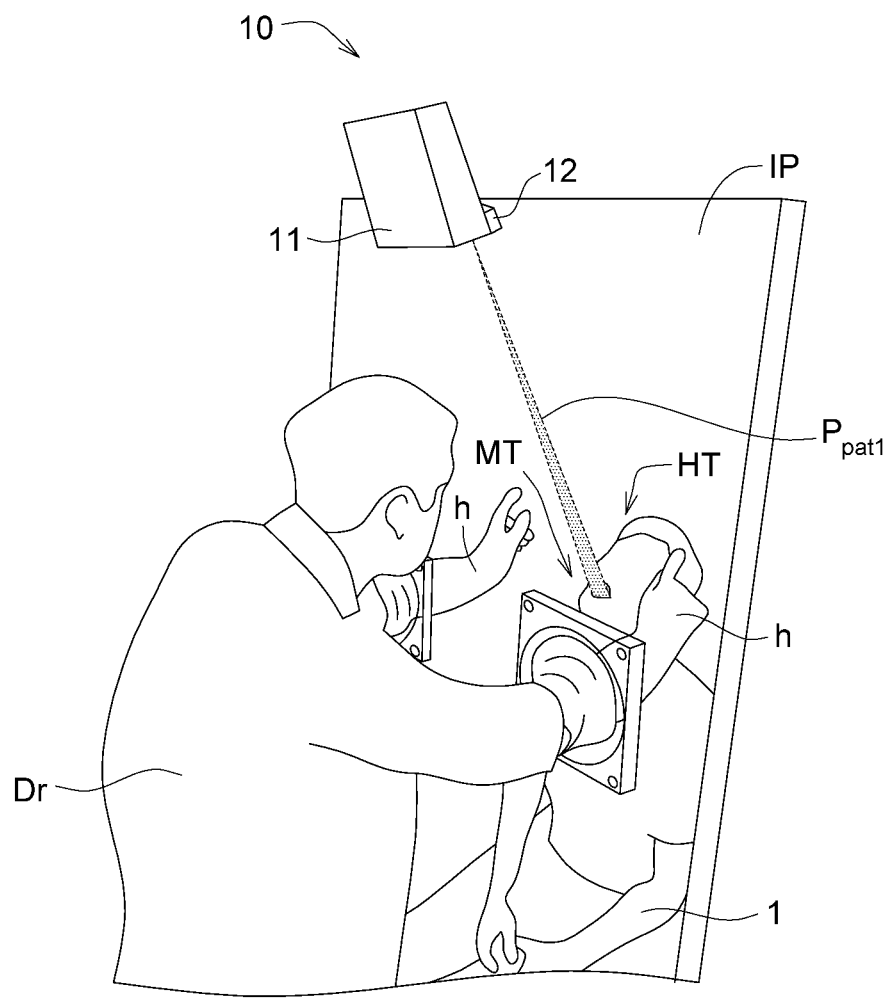
FIG. 13A is a practical example when the object is a face.

FIG. 13A is a practical example when the object is a face HF. Referring to FIG. 13A, in one embodiment, the system 10 for projecting patterned light may be applied to oral inspection to facilitate the sampling personnel Dr sampling the oral cavity of the person 1; or in a non-illustrated embodiment, it may facilitate the dentist examining the patient's oral condition. When the sampling personnel Dr wants to take samples from the oral cavity of the person 1, the sampling personnel Dr have to put his hands through the isolation plate IP and into the isolation gloves h for sampling in order to reduce the risk of infection. At this time, if the lighting conditions are not good, it is inconvenient for the sampling personnel Dr to adjust the lighting conditions with his bare hands; if trying to adjust with his bare hands, it may be easy to increase the risk of infection. As described in the previous content, the projection module 11 may project the projection pattern $P_{pat1}$ with shape corresponding to the mouth MT onto the face HF, and the projection pattern $P_{pat1}$ may change automatically with the shape and position of the mouth MT to facilitate illumination, so that the sampling personnel Dr may clearly view the inside of the oral cavity of the person 1, and the sampling personnel Dr does not need to adjust the light by manual means so as to reduce the risk of cross-infection.

Figure 13B:
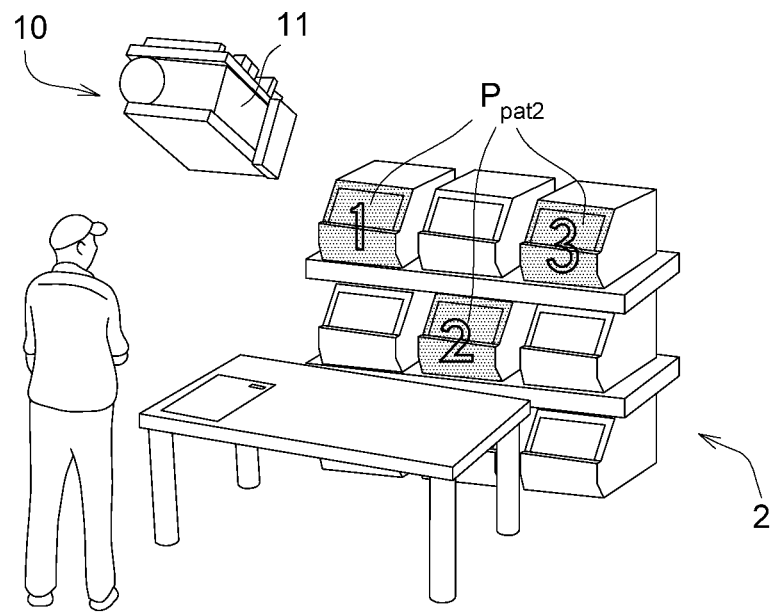
FIG. 13B is a practical example when the object is a material basket.

FIG. 13B is a practical example when the object is a material basket 2. Referring to FIG. 13B, in one embodiment, the system 10 for projecting patterned light may be applied to the guidance for the operator on picking up the material in the material basket 2. The parts (e.g. different sizes of screws in separate material baskets 2), goods and/or merchandise (e.g. different PET bottles of drinks in different material baskets 2) may be contained in the material basket 2. The projection module 11 may project a projection pattern $P_{pat2}$ with a corresponding shape onto the material basket 2 to be picked up according to the sequence of the work order, and the projection pattern $P_{pat2}$ may also include the sequence of picking up the material. For example, in FIG. 13B, the projection module 11 projects the projection pattern $P_{pat2}$ showing the numbers "1", "2" and "3" onto three different material baskets 2, which represent the order of picking up the material, so as to guide and assist the operator to pick up the material according to the sequence of the numbers.

Figure 13C:
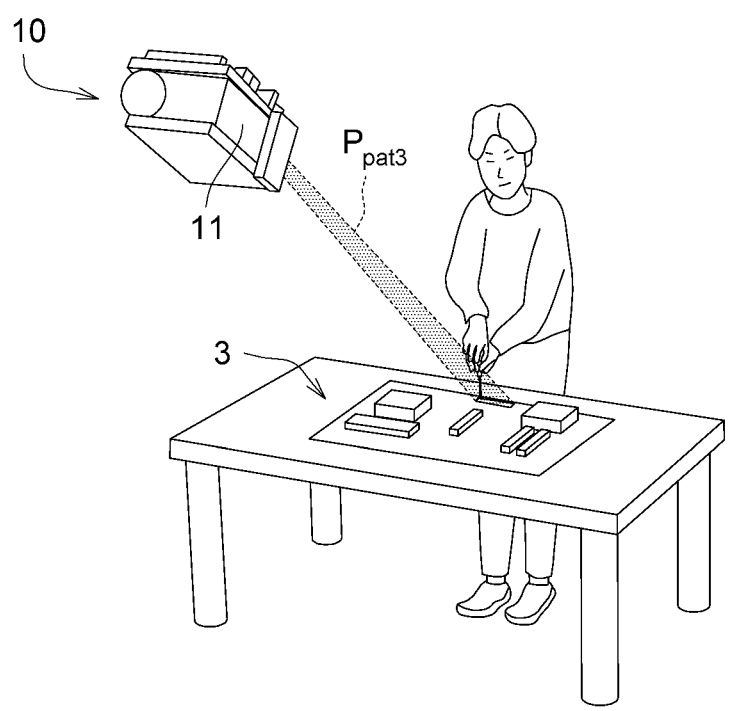
FIG. 13C is a practical example when the object is a product to be assembled.

FIG. 13C is a practical example when the object is a product 3 to be assembled. Referring to FIG. 13C, in one embodiment, the system 10 for projecting patterned light may be applied to the guidance for the operator on the assembly of a product, for example, the assembly of a circuit board. The projection module 11 may project a projection pattern $P_{pat3}$ with a corresponding shape, such as a projection pattern $P_{pat3}$ with shape corresponding to a component on the circuit board, onto the product 3 to be assembled according to the sequence of assembly, so that the operator knows that the component should be assembled at this time, so as to guide and assist the operator in the assembly. After the assembly of the component is completed, the projection module 11 then projects the projection pattern $P_{pat3}$ onto another component of the circuit board according to the order of assembly to guide the operator in the assembly of another component. By guiding and assisting the operator in the assembly, Gage R&R may be realized to prevent the operator from misassembling or missing the assembly of components. In addition, it is possible to guide a person who is unfamiliar with the assembly process to perform the assembly.

Figure 14:
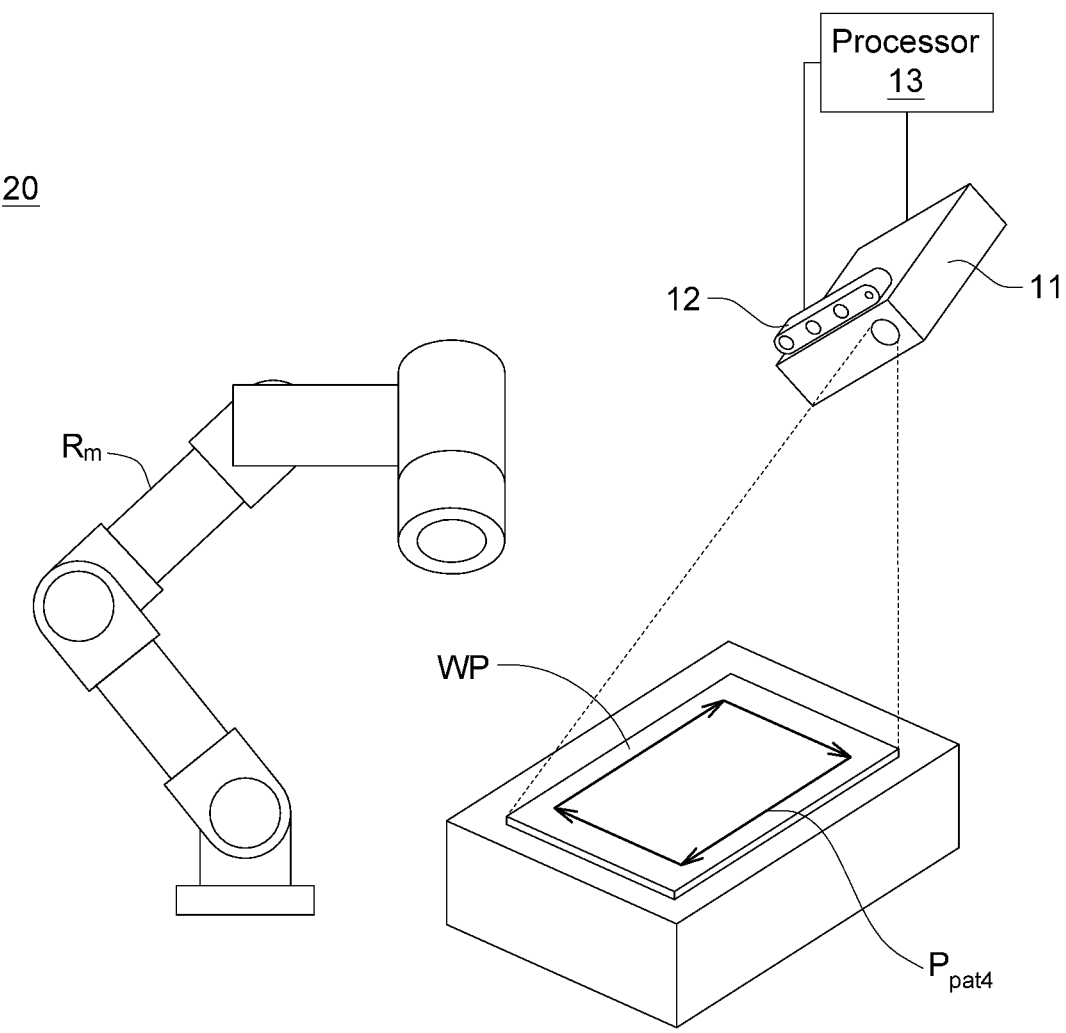
FIG. 14 is a schematic diagram of a machining system according to one embodiment of the disclosure.

FIG. 14 is a schematic diagram of a machining system 20 according to one embodiment of the disclosure. The machining system 20 includes a robotic arm Rm, a projection module 11, an image-capturing module 12 and a processor 13. The projection module 11, the image-capturing module 12, and the processor 13 are similar to the aforementioned embodiments and will not be described here.

Figure 15:
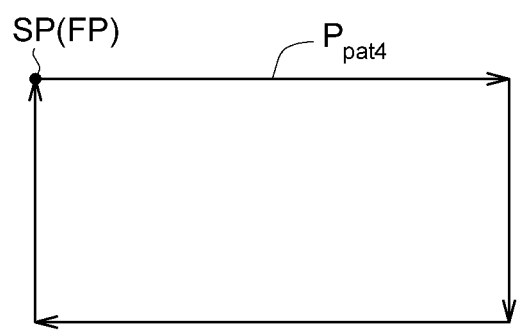
FIG. 15 shows a machining path pattern corresponding to the machining path.

In the present embodiment, the robotic arm Rm may track the position of the workpiece WP through the field of view of a camera by visual recognition, and automatically generate a machining path according to the position-tracked workpiece WP, and then process the workpiece WP along the machining path. Before the robotic arm Rm processes the workpiece WP, the projection module 11 may project a machining path pattern $P_{pat4}$ onto the workpiece WP to let the operator identify whether the machining path of the robotic arm Rm is correct in advance, so as to avoid an incorrect machining path after the robotic arm Rm processes the workpiece WP. Furthermore, in the present embodiment, the machining path pattern $P_{pat4}$ represents a machining path. As shown in FIG. 15, a machining path pattern $P_{pat4}$ corresponding to the machining path is shown. The machining path pattern $P_{pat4}$ is composed of a start point SP, an end point FP and a path between them. In the present embodiment, the upper left corner of the figure is the start point as well as the end point, but the present disclosure is not limited thereto. In other words, the start point SP and the end point FP may be the same point or different points, which may not be a limitation in the present disclosure.

Figure 16:
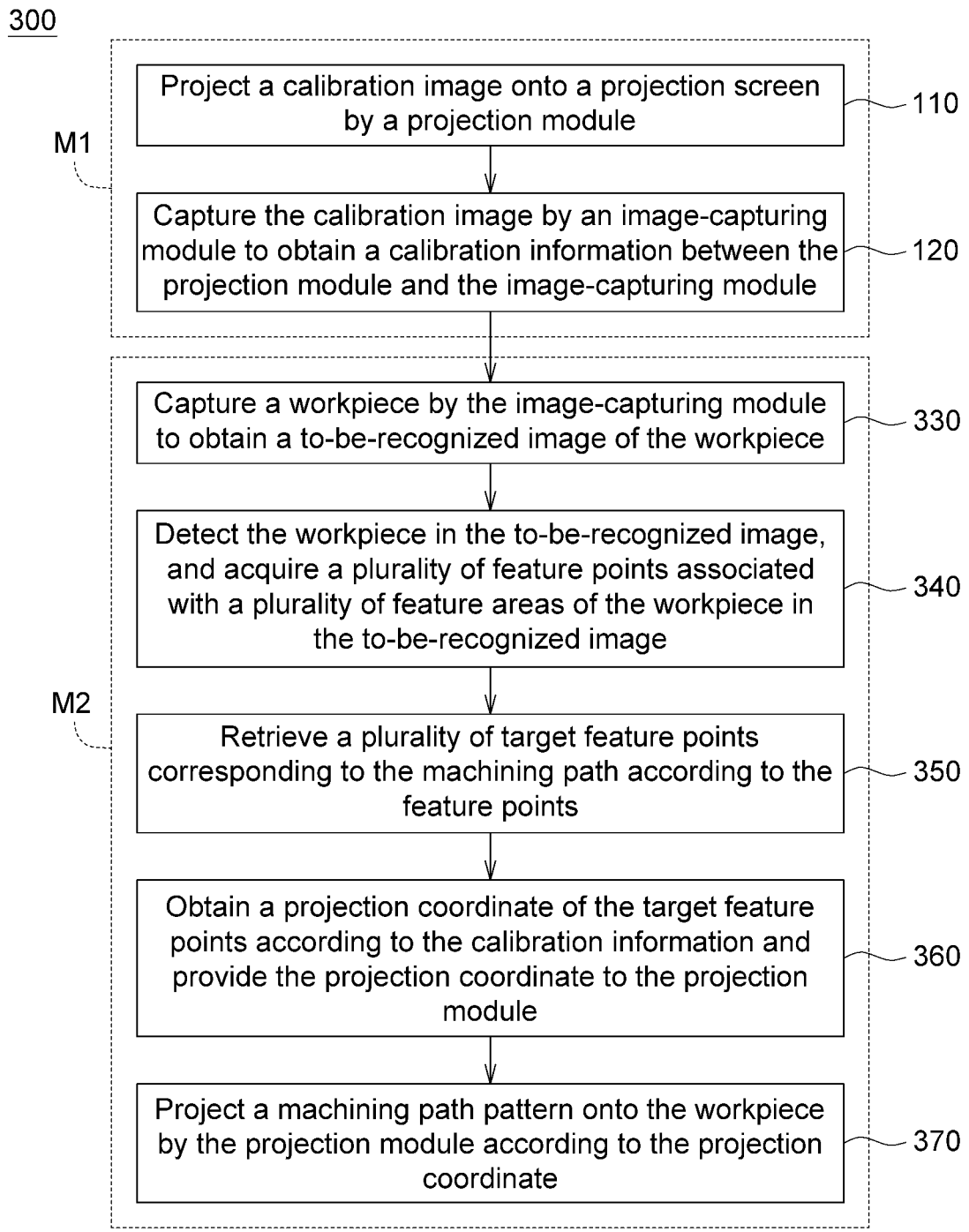
FIG. 16 is a flowchart showing the method for projecting patterned light is applied to the machining system according to one embodiment of the disclosure.
Figure 17:
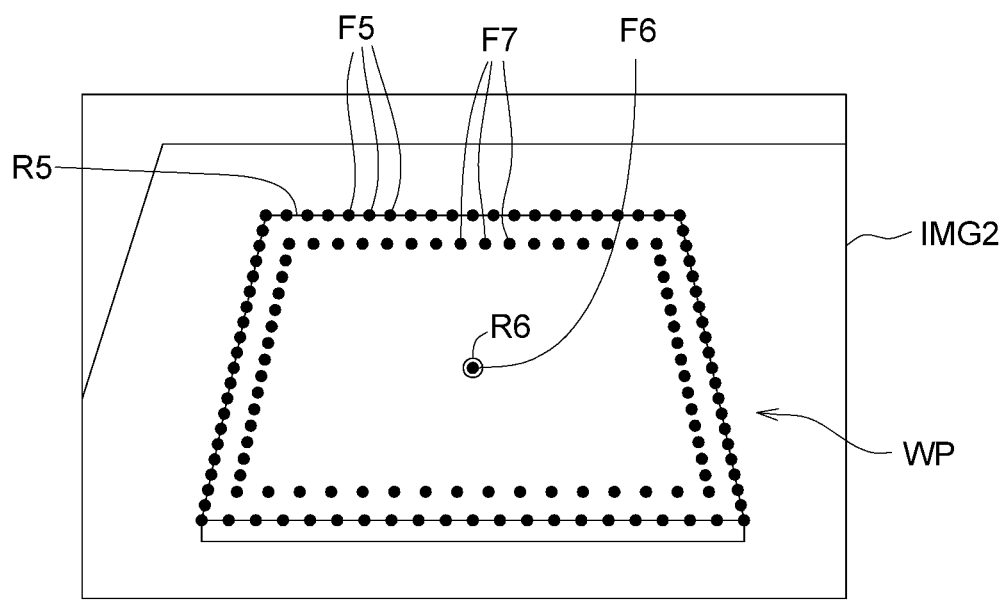
FIG. 17 shows a to-be-recognized image of the workpiece and a plurality of feature points associated with the workpiece.

FIG. 16 is a flowchart showing the method 300 for projecting patterned light is applied to the machining system 20 according to one embodiment of the disclosure. FIG. 17 shows a to-be-recognized image IMG2 of the workpiece WP. Referring to FIG. 14 and FIG. 16, the steps in the calibration mode M1 are as described above and will not be repeated here. In step 330 in the projection mode M2, the image-capturing module 12 captures a workpiece WP to obtain a to-be-recognized image IMG2 of the workpiece WP, as shown in FIG. 17.

In step 340, the processor 13 detects the workpiece WP in the to-be-recognized image IMG2, and acquires a plurality of feature points associated with a plurality of feature areas of the workpiece WP in the to-be-recognized image IMG2. As shown in FIG. 17, the processor 13 may identify the feature areas associated with the workpiece WP based on the visual recognition algorithm. The feature areas are, for example, edge area R5 and central area R6. Each feature area may be composed of a plurality of feature points, e.g., the edge area R5 is composed of a plurality of edge feature points F5, and the central area R6 is composed of a central point F6. Thus, the processor 13 may acquire the edge feature points F5 of the edge area R5 corresponding to the contour of the workpiece WP.

In step 350, the processor 13 retrieves a plurality of target feature points F7 corresponding to the machining path according to the feature points (e.g., the edge feature points F5). As shown in FIG. 17, the processor 13 may retrieve the feature points, which are obtained by retracting the edge feature points F5 inwardly in a distance, as a plurality of target feature points F7 corresponding to the machining path.

In step 360, the processor 13 obtains a projection coordinate of the target feature points F7 according to the calibration information and provides the projection coordinate to the projection module 11. In one embodiment, the step 360 of obtaining the projection coordinate of the target feature points F7 may follow the manner described in FIG. 10. For example, the processor 13 may first search for a central area R6 of the workpiece WP and retrieve a central point F6 corresponding to the central area R6 as the reference feature point. Next, as described above, the processor 13 may obtain a depth value corresponding to the center of the workpiece WP from the image-capturing module 12, so as to obtain the depth value of the central point F6. Afterwards, the processor 13 transforms coordinates of the target feature points F7 into the projection coordinate using the calibration information corresponding to the depth value. That is, the processor 13 may select the calibration matrix corresponding to the depth value of the central point F6 from the stored calibration matrixes, and use the calibration matrix to transform the image coordinates of the target feature points F7 into the projection coordinate, and provide the projection coordinate to the projection module 11.

Next, in step 370, the projection module 11 projects a machining path pattern $P_{pat4}$ onto the workpiece WP according to the projection coordinate. Referring to FIG. 14 and FIG. 15, the projection module 11 may generate the light effect with the machining path pattern $P_{pat4}$ for the area of the machining path, and does not project light to the remaining area other than the machining path, so that the projection module 11 may, for a specific area of the workpiece WP, project the machining path pattern $P_{pat4}$ with shape corresponding to the machining path onto the workpiece WP, so as to generate light effect with specific light pattern.

In summary, according to a visual recognition based method and system for projecting patterned light, a method and system applied to oral inspection, and a machining system provided in the present disclosure, a projection pattern with specific shape is produced for a specific area of an object by a projection module, and the projection pattern is projected onto the object so as to generate light effect with specific light pattern, or achieve guiding and assisting functions with light effect having specific light pattern.

In addition, in the embodiments, the projection module is used to project the calibration image onto the projection screen for calibration, preventing the inconvenience of using a physical calibration board. Moreover, in the embodiments, the calibration image with graphic labels is also developed in the present disclosure to improve the calibration quality compared to previous calibration methods.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A visual recognition based method for projecting patterned light comprising:
    projecting a calibration image onto a projection screen by a projection module;
    capturing the calibration image by an image-capturing module to obtain a calibration information between the projection module and the image-capturing module;
    capturing an object by the image-capturing module to obtain a to-be-recognized image of the object;
    detecting the object in the to-be-recognized image, and acquiring a plurality of feature points associated with a plurality of feature areas of the object in the to-be-recognized image;
    retrieving a plurality of target feature points corresponding to a target object from the feature points;
    obtaining a projection coordinate of the target feature points according to the calibration information, and providing the projection coordinate to the projection module; and
    projecting a projection pattern with shape corresponding to the target object onto the object by the projection module according to the projection coordinate.

2. The visual recognition based method for projecting patterned light according to claim 1, wherein the calibration image comprises a plurality of graphic labels respectively disposed in corners of the calibration image.

3. The visual recognition based method for projecting patterned light according to claim 2, wherein the step of obtaining the calibration information between the projection module and the image-capturing module comprises:
    iteratively performing following steps with different projection distances:
        projecting the calibration image onto the projection screen by the projection module at a projection distance for the image-capturing module to capture the calibration image;
        identifying the graphic labels according to the captured calibration image;
        obtaining coordinates of a plurality of alignment points which the identified graphic labels correspond to;
        obtaining coordinates of a plurality of reference points of a standard screen; and
        transforming the coordinates of the alignment points and the coordinates of the reference points to obtain a calibration matrix corresponding to the projection distance; and
    a plurality of calibration matrixes corresponding to the different projection distances as the calibration information.

4. The visual recognition based method for projecting patterned light according to claim 3, wherein the reference points are corners of the standard screen.

5. The visual recognition based method for projecting patterned light according to claim 3, wherein the step of obtaining the coordinates of the alignment points which the identified graphic labels correspond to comprises:
    respectively obtaining a plurality of depth values of the graphic labels by the image-capturing module;
    calculating an average depth information based on the depth values;
    wherein when a difference between each of the depth values of the graphic labels and the average depth information is less than a threshold value, the coordinates of the alignment points are obtained.

6. The visual recognition based method for projecting patterned light according to claim 5, wherein in the step of obtaining the coordinates of the alignment points which the identified graphic labels correspond to, the depth values of the graphic labels and the average depth information are projected onto the projection screen by the projection module.

7. The visual recognition based method for projecting patterned light according to claim 1, wherein the object is a face, a workpiece, a material basket or a product to be assembled.

8. The visual recognition based method for projecting patterned light according to claim 1, wherein the target object is a mouth, and the projection pattern is in the shape of the mouth.

9. The visual recognition based method for projecting patterned light according to claim 1, further comprising:
when detecting the object in the to-be-recognized image fails, the brightness of the to-be-recognized image is adjusted.

10. The visual recognition based method for projecting patterned light according to claim 1, wherein the step of obtaining the projection coordinate of the target feature points according to the calibration information, and providing the projection coordinate to the projection module comprises:
searching for a reference area according to the feature areas and retrieving a reference feature point from the reference area;
obtaining a depth value corresponding to the reference feature point; and
transforming coordinates of the target feature points into the projection coordinate using the calibration information corresponding to the depth value.

11. The visual recognition based method for projecting patterned light according to claim 1, wherein the image-capturing module is a depth camera.

12. A visual recognition based system for projecting patterned light, provided with a calibration mode and a projection mode, comprising:
a projection module configured for projecting a calibration image onto a projection screen in the calibration mode;
an image-capturing module configured for capturing the calibration image in the calibration mode, and capturing an object in the projection mode to obtain a to-be-recognized image of the object; and
a processor coupled to the projection module and the image-capturing module and configured for, in the calibration mode, obtaining a calibration information between the projection module and the image-capturing module according to the captured calibration image, and, in the projection mode, detecting the object in the to-be-recognized image, acquiring a plurality of feature points associated with a plurality of feature areas of the object in the to-be-recognized image, retrieving a plurality of target feature points corresponding to a target object from the feature points, obtaining a projection coordinate of the target feature points according to the calibration information and providing the projection coordinate to the projection module, and commanding the projection module to project a projection pattern with shape corresponding to the target object onto the object according to the projection coordinate.

13. The visual recognition based system for projecting patterned light according to claim 12, wherein the projection module and the image-capturing module are all-in-one.

14. The visual recognition based system for projecting patterned light according to claim 12, wherein the calibration image comprises a plurality of graphic labels respectively disposed in corners of the calibration image.

15. The visual recognition based system for projecting patterned light according to claim 14, wherein the projection module projects he calibration image onto the projection screen at a projection distance for the image-capturing module to capture the calibration image, and the processor identifies the graphic labels according to the captured calibration image, obtains coordinates of a plurality of alignment points which the identified graphic labels correspond to, obtains coordinates of a plurality of reference points of a standard screen, and transforms the coordinates of the alignment points and the coordinates of the reference points to obtain a calibration matrix corresponding to the projection distance;
wherein in the calibration mode, the projection module projects the calibration image onto the projection screen at different projection distances, so as to obtain a plurality of calibration matrixes corresponding to the different projection distances as the calibration information.

16. The visual recognition based system for projecting patterned light according to claim 15, wherein the reference points are corners of the standard screen.

17. The visual recognition based system for projecting patterned light according to claim 15, wherein the processor respectively obtains a plurality of depth values of the graphic labels from the image-capturing module, and calculates an average depth information based on the depth values;
wherein when a difference between each of the depth values of the graphic labels and the average depth information is less than a threshold value, the processor obtains the coordinates of the alignment points.

18. The visual recognition based system for projecting patterned light according to claim 17, wherein the projection module projects the depth values of the graphic labels and the average depth information are projected onto the projection screen.

19. The visual recognition based system for projecting patterned light according to claim 12, wherein the object is a face, a workpiece, a material basket or a product to be assembled.

20. The visual recognition based system for projecting patterned light according to claim 12, wherein the target object is a mouth, and the projection pattern is in the shape of the mouth.

21. The visual recognition based system for projecting patterned light according to claim 12, wherein when detecting the object in the to-be-recognized image fails, the processor adjusts the brightness of the to-be-recognized image.

22. The visual recognition based system for projecting patterned light according to claim 12, wherein the processor searches for a reference area according to the feature areas and retrieves a reference feature point from the reference area, obtains a depth value corresponding to the reference feature point, and transforms coordinates of the target feature points into the projection coordinate using the calibration information corresponding to the depth value.

23. The visual recognition based system for projecting patterned light according to claim 12, wherein the image-capturing module is a depth camera.

24. A method applied to oral inspection comprising:
projecting a calibration image onto a projection screen by a projection module;
capturing the calibration image by an image-capturing module to obtain a calibration information between the projection module and the image-capturing module;
capturing a human's face by the image-capturing module to obtain a to-be-recognized image of the human's face;

detecting the human's face in the to-be-recognized image, and acquiring a plurality of feature points associated with a plurality of facial features of the human's face in the to-be-recognized image;

retrieving a plurality of mouth feature points corresponding to a human's mouth from the feature points;

obtaining a projection coordinate of the mouth feature points according to the calibration information, and providing the projection coordinate to the projection module; and projecting a projection pattern with shape corresponding to the human's mouth onto the human's face by the projection module according to the projection coordinate.

25. The method applied to oral inspection according to claim 24, wherein the step of obtaining the projection coordinate of the mouth feature points according to the calibration information, and providing the projection coordinate to the projection module comprises:

searching for a nose area according to the facial features and retrieving a nose feature point from the nose area;

obtaining a depth value corresponding to the nose feature point; and transforming coordinates of the mouth feature points into the projection coordinate using the calibration information corresponding to the depth value.

26. The method applied to oral inspection according to claim 24, wherein the image-capturing module is a depth camera.

27. The method applied to oral inspection according to claim 25, wherein the nose feature point is a feature point of a nose tip.

28. A system applied to oral inspection, provided with a calibration mode and a projection mode, comprising:

a projection module configured for projecting a calibration image onto a projection screen in the calibration mode;

an image-capturing module configured for capturing the calibration image in the calibration mode, and capturing a human's face in the projection mode to obtain a to-be-recognized image of the human's face; and a processor coupled to the projection module and the image-capturing module and configured for, in the calibration mode, obtaining a calibration information between the projection module and the image-capturing module according to the captured calibration image, and, in the projection mode, detecting the human's face in the to-be-recognized image, acquiring a plurality of feature points associated with a plurality of facial features of the human's face in the to-be-recognized image, retrieving a plurality of mouth feature points corresponding to a human's mouth from the feature points, obtaining a projection coordinate of the mouth feature points according to the calibration information and providing the projection coordinate to the projection module, and commanding the projection module to project a projection pattern with shape corresponding to the human's mouth onto the human's face according to the projection coordinate.

29. The system applied to oral inspection according to claim 28, wherein the projection module and the image-capturing module are all-in-one.

30. The system applied to oral inspection according to claim 28, wherein the processor searches for a nose area according to the facial features and retrieves a nose feature point from the nose area, obtains a depth value corresponding to the nose feature point, and transforms coordinates of the nose feature points into the projection coordinate using the calibration information corresponding to the depth value.

31. The system applied to oral inspection according to claim 30, wherein the nose feature point is a feature point of a nose tip.

32. The system applied to oral inspection according to claim 28, wherein the image-capturing module is a depth camera.

33. A machining system, provided with a calibration mode and a projection mode, comprising:

a robotic arm configured for machining a workpiece along a machining path;

a projection module configured for projecting a calibration image onto a projection screen in the calibration mode;

an image-capturing module configured for capturing the calibration image in the calibration mode, and capturing the workpiece in the projection mode to obtain a to-be-recognized image of the workpiece; and a processor coupled to the projection module and the image-capturing module and configured for, in the calibration mode, obtaining a calibration information between the projection module and the image-capturing module according to the captured calibration image, and, in the projection mode, detecting the workpiece in the to-be-recognized image, acquiring a plurality of feature points associated with a plurality of feature areas of the workpiece in the to-be-recognized image, retrieving a plurality of target feature points corresponding to the machining path according to the feature points, obtaining a projection coordinate of the target feature points according to the calibration information and providing the projection coordinate to the projection module, and commanding the projection module to project a machining path pattern onto the workpiece according to the projection coordinate.

34. The machining system according to claim 33, wherein the feature points correspond to any point on the contour of the workpiece.

35. The machining system according to claim 33, wherein the processor searches for a central area of the workpiece according to the feature areas and retrieves a central point corresponding to the central area, obtains a depth value corresponding to the central point from the image-capturing module, and transforms coordinates of the target feature points into the projection coordinate using the calibration information corresponding to the depth value.

* * * * *